United States Patent
Kumar et al.

(10) Patent No.: US 11,393,068 B2
(45) Date of Patent: Jul. 19, 2022

(54) METHODS AND APPARATUS FOR EFFICIENT INTERPOLATION

(71) Applicant: Samsung Electronics Co., Ltd., Suwon-si (KR)

(72) Inventors: Rahul Kumar, Sunnyvale, CA (US); Fnu Gurupad, San Jose, CA (US); David Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 255 days.

(21) Appl. No.: 16/667,902

(22) Filed: Oct. 29, 2019

(65) Prior Publication Data
US 2020/0402202 A1 Dec. 24, 2020

Related U.S. Application Data

(60) Provisional application No. 62/864,451, filed on Jun. 20, 2019.

(51) Int. Cl.
*G06T 3/40* (2006.01)
(52) U.S. Cl.
CPC .................. *G06T 3/4007* (2013.01)
(58) Field of Classification Search
CPC ............................. G06T 3/4007; G06T 3/403
See application file for complete search history.

(56) References Cited

U.S. PATENT DOCUMENTS

| | | | |
|---|---|---|---|
| 2009/0028465 A1* | 1/2009 | Pan | G06T 3/4007 382/300 |
| 2015/0036942 A1 | 2/2015 | Smirnov et al. | |
| 2018/0376126 A1 | 12/2018 | Hannuksela | |
| 2019/0197739 A1* | 6/2019 | Sinharoy | G06T 9/00 |
| 2019/0333237 A1* | 10/2019 | Javidnia | G06T 3/4007 |
| 2021/0279957 A1* | 9/2021 | Eder | G06T 7/50 |

FOREIGN PATENT DOCUMENTS

CN 110503618 A * 11/2019

OTHER PUBLICATIONS

NASA SeaDAS, "BEAM Help—Resampling Methods", Jan. 25, 2019 (https://seadas.gsfc.nasa.gov/help/general/ResamplingMethods.html, retrieved Jun. 25, 2019), 2 pages.

* cited by examiner

*Primary Examiner* — Charles T Shedrick
(74) *Attorney, Agent, or Firm* — Renaissance IP Law Group LLP

(57) ABSTRACT

A method for interpolating values of an attribute for an image grid may include determining a root value of the attribute for a root node located centrally in the image grid, pre-calculating metadata for multiple child nodes in one or more hierarchical levels based on one or more gradients of the attribute, and deriving values of the attribute for each of the child nodes at each of the hierarchical levels based on the corresponding root value and metadata for the hierarchical level of each child node, wherein each child node may be used as a root node in the next hierarchical level. The image grid may have multiple outer cells arranged radially around a central cell, and the root node may be located in the central cell.

20 Claims, 12 Drawing Sheets

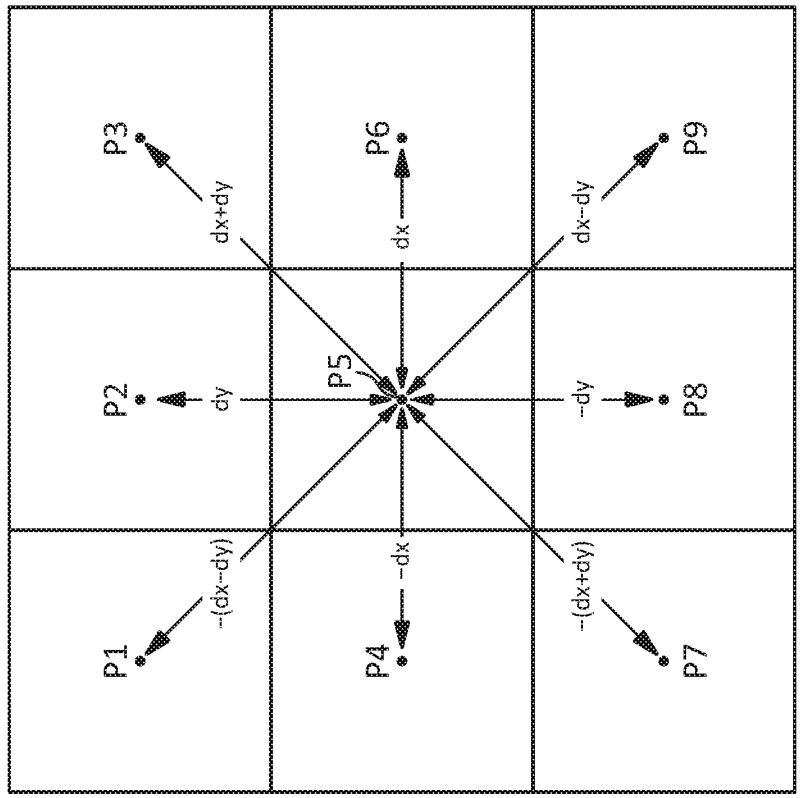
FIG. 4 Plane Equation
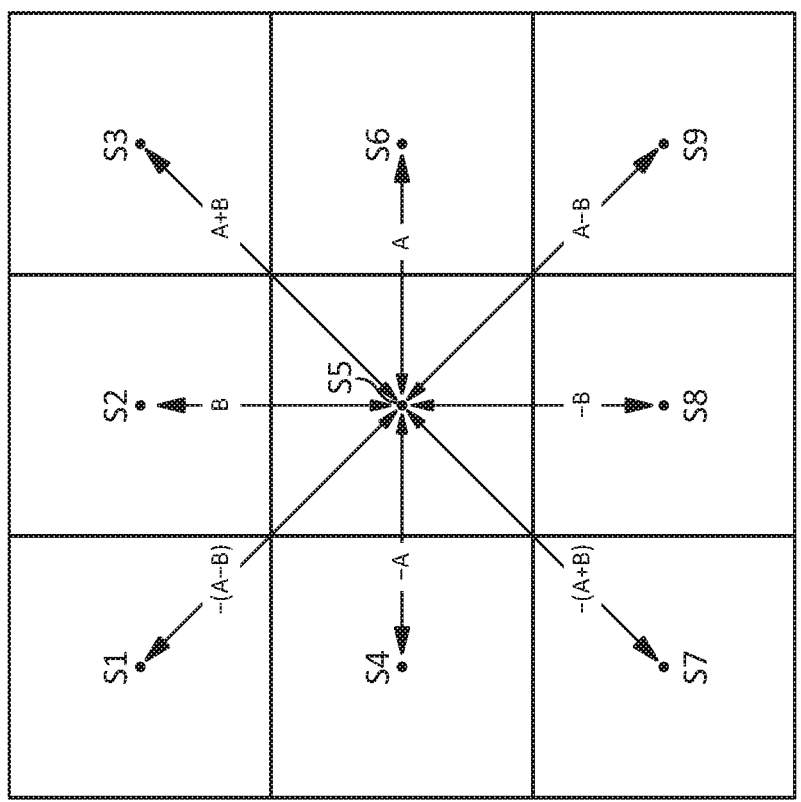
FIG. 5 Edge Equation

METHODS AND APPARATUS FOR EFFICIENT INTERPOLATION

CROSS-REFERENCE TO RELATED APPLICATION

This application claims priority to, and the benefit of, U.S. Provisional Patent Application Ser. No. 62/864,451 titled "A Method and Apparatus For Energy Efficient Sample Interpolation" filed Jun. 20, 2019 which is incorporated by reference.

BACKGROUND

1. Field

This disclosure relates generally to interpolation, and more specifically to methods and apparatus for efficient interpolation of nodes in grids such as image grids.

2. Related Art

Interpolation is a process used to determine the value of an attribute at unknown data points located between known data points. Interpolation may be used, for example, in image processing to find intermediate values of an attribute for a collection of pixels which are spatially adjacent to each other and located inside a primitive, which is a fundamental unit of geometry used to create larger images. Interpolators consume resources such as power and area on integrated circuits. The high cost and power consumption of conventional interpolator may limit the throughput, or speed at which pixels may be rendered. However, displays continue to provide higher resolution, work with more primitives, and/or work on larger image domains than the conventional tile domain, which is a subset of an image. Moreover, downstream image processing apparatus such as execution units that use and/or transform data from interpolators continue to improve. This may create a mismatch between the bandwidth of an interpolator and the downstream unit, which may result in low utilization of the downstream unit, and/or low frame rates on rendering devices. Thus, there is a need for interpolators that may operate with greater efficiency and/and or throughput.

SUMMARY

A method for interpolating attribute values for an image grid, the method including determining a first-level root value of an attribute at a first-level root node located centrally in the image grid, calculating first-level metadata based on a first gradient of the attribute in a first direction and a second gradient of the attribute in a second direction, and deriving, based on the first-level root value and the first-level metadata, first-level child values of the attribute for two or more first-level child nodes arranged radially around the first-level root node in the image grid. The method may further include using one of the first-level child nodes and its corresponding first-level child value as a second-level root node and second-level root value for a cell of the image grid, wherein the root node of the cell is located centrally in the cell, calculating second-level metadata based on the first gradient and the second gradient, and deriving, based on the second-level root value and the second-level metadata, second-level child values of the attribute for two or more second-level child nodes arranged radially around the second-level root node in the cell. Each of the first-level child nodes may be offset symmetrically from the first-level root node in the first and second directions. Each of the first-level child nodes may be offset from the first-level root node by substantially zero or substantially the same distance in the first and second directions. The image grid may include a 3×3 array of cells having a center cell and eight outer cells, the two or more first-level child nodes may include eight first-level child nodes, the first-level root node may be located at a center of the center cell, and each first-level child node may be located at a center of one of the outer cells. The first-level metadata may include incremental values of the attribute for offsets in the first and second directions. A value of a first parameter A may be based on the first gradient, and a value of a second parameter B may be based on the second gradient. The first-level metadata may include the values A, B, A+B, and A−B. A value of a first parameter A may be based on the first gradient, a value of a second parameter B may be based on the second gradient, the image grid comprises a 3×3 array of cells, the first-level metadata may include the values 3A, 3B, 3(A+B), and 3(A−B), and the second-level metadata may include the values A, B, A+B, and A−B. The first-level metadata may be calculated based on a plane equation. The plane equation may have the form $P(x, y)=A*(x-Seed\_X)+B*(y-Seed\_Y)+C$, where P may be a parameter of a two-dimensional surface which may be interpolated at each location $(x, y)$, wherein x may be a distance in an x-direction and y may be a distance in a y-direction, A may be a gradient per pixel (or other cell) in the x direction, B may be a gradient per pixel (or other cell) in the y direction, and C may be a value of P at a location (Seed_X, Seed_Y). Deriving the first-level child values may include adding one or more of the first-level metadata to the first-level root value. The first-level root node and each first-level child node may correspond to pixels. The first-level root node and each first-level child node may correspond to samples. The method may further include rasterizing an image in response to the values of the attribute. The attribute may include a first value indicating a node may be inside a primitive and a second value indicating a node may be outside of a primitive.

A method for interpolating values of an attribute for an image grid may include determining a root value of the attribute for a root node located centrally in the image grid, pre-calculating metadata for multiple child nodes in one or more hierarchical levels based on one or more gradients of the attribute, and deriving values of the attribute for each of the child nodes at each of the hierarchical levels based on the corresponding root value and metadata for the hierarchical level of each child node, wherein each child node may be used as a root node in the next hierarchical level. The image grid may have multiple outer cells arranged radially around a central cell, and the root node may be located in the central cell. The root node may be located in a first cell having one or more additional nodes, and the method may further include determining values of the attribute for the one or more additional nodes in the first cell, and deriving values of the attribute for additional child nodes corresponding to each of the additional nodes in the first cell at each of the hierarchical levels, wherein the value of the attribute for each additional child node may be derived based on the value of the attribute for the corresponding additional node in the first cell, and the metadata for the corresponding hierarchical level. The values of the attribute for the additional child nodes may be derived through a separate hierarchical tree for each of the nodes in the first cell. The first cell may be a pixel, and each of the nodes in the first cell may be samples. The samples in the pixel may be used for multi-sample anti-aliasing (MSAA).

A system for interpolating values of an attribute for an image grid may include a root unit configured to determine a root value of the attribute for a root node located centrally in the image grid, a metadata unit configured to pre-calculate metadata for multiple child nodes in one or more hierarchical levels based on one or more parameters of the attribute, and a tree of one or more logic stages coupled to the root unit and metadata unit and configured to derive values of the attribute for each of the child nodes at each of the hierarchical levels based on the corresponding root value and metadata for the hierarchical level of each child node. One or more of the logic stages may include combinational logic having two-input adders arranged to add the root value of the attribute to metadata for multiple child nodes. The system may further include a redirection unit coupled between the root unit and the tree and configured to rearrange the manner in which samples are directed from the root unit to the tree based on an operating mode. The logic stages may be configured to handle multiple samples in a multi-sample operating mode. The image grid may be a first sub-grid of a larger image grid, and the system may further include a second root unit configured to determine a second root value of a second attribute for a second root node located centrally in a second sub-grid of the larger image grid, a second metadata unit configured to pre-calculate second metadata for multiple second child nodes in one or more hierarchical levels based on one or more parameters of the second attribute, and a second tree of one or more logic stages coupled to the second root unit and second metadata unit and configured to derive values of the second attribute for each of the second child nodes at each of the hierarchical levels based on the corresponding second root value and second metadata for the hierarchical level of each second child node. The second root unit, the second tree, and the second metadata unit may be configured to selectively use the attribute for the first sub-grid as the second attribute for the second sub-grid. The attributes for the first and second sub-grids may be used for different primitives. The system may further include one or more additional logic stages coupled in a serialized hybrid configuration between the root unit and the tree, wherein the one or more additional logic stages use an interpolation technique that is substantially different from the tree of one or more logic stages. The system may be implemented in hardware, software or a combination thereof. The hardware may include an integrated circuit.

An apparatus for interpolating values of an attribute for an image grid may include a tree of one or more logic stages configured to derive values of the attribute for multiple child nodes located around a centrally located root node at each of one or more hierarchical levels based on a corresponding value of the attribute at the root node and metadata for the hierarchical level. The apparatus may further include a metadata unit coupled to the tree of one or more logic stages and configured to pre-calculate the metadata for the multiple child nodes in each of the one or more hierarchical levels based on one or more parameters of the attribute. The apparatus may further include a root unit coupled to the tree of one or more logic stages and configured to determine the root value of the attribute for a root node in an image grid. One or more of the logic stages may include combinational logic two-input adders arranged to add the root value of the attribute to metadata for multiple child nodes. The apparatus may further include one or more additional logic stages coupled in a serialized hybrid configuration to the tree, wherein the one or more additional logic stages use an interpolation technique that is substantially different from the tree of one or more logic stages. The tree of one or more logic stages may be implemented in an integrated circuit. Further and/or additional configurations are contemplated.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

FIG. 4 illustrates an example embodiment of a method for interpolating values of an attribute using a plane equation according to the principles of this disclosure.

FIG. 5 illustrates an example embodiment of a method for interpolation for rasterization using edge equations according to the principles of this disclosure.

DETAILED DESCRIPTION

Figure 1:
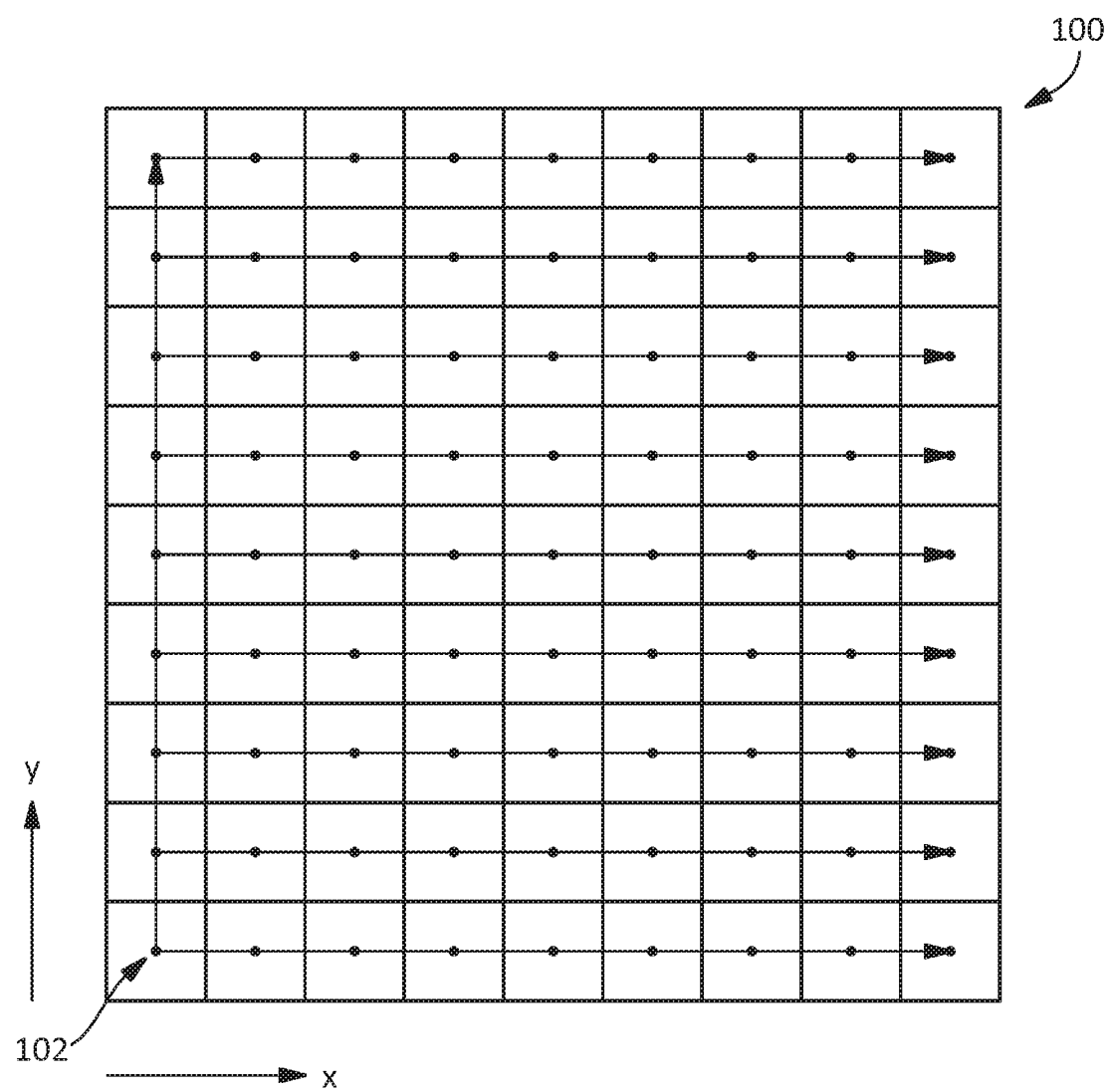
FIG. 1 illustrates a conventional technique for interpolating values of an attribute for a pixel grid.

FIG. 1 illustrates a conventional technique for interpolating values of an attribute for a 9-pixel by 9-pixel grid 100. The value of the attribute may first be determined for the bottom left corner pixel at a sample point 102. The values of the attribute at the sample points for the other pixels may then be found by progressing through the grid on a pixel-by-pixel basis in the x and y directions, as shown by the arrows in FIG. 1. An incremental value of the attribute for each pixel is added to the summed value of the attribute for the previous pixel. (The incremental value is sometimes referred to as the "delta" of the attribute.) The incremental value of the attribute for each pixel may be based on the x and y-offsets of each pixel relative to the previous pixel, as well as a function that may be used to determine the value of the attribute at any pixel.

The x and y-offsets of each pixel, however, may be variable for each row and/or column, so the attribute calculation for each node may require a 3-input addition which may be relatively expensive to implement in hardware or software. Moreover, the logic level for a hardware implementation of an n-pixel by n-pixel grid may be 2n. Yet another disadvantage may be the area required for the hardware to implement the technique of FIG. 1 which may increase geometrically as the value of n increases. Further, a hardware implementation may result in relatively large fan-out which may require larger and/or more expensive drivers to avoid additional delay in the calculations.

Figure 2:
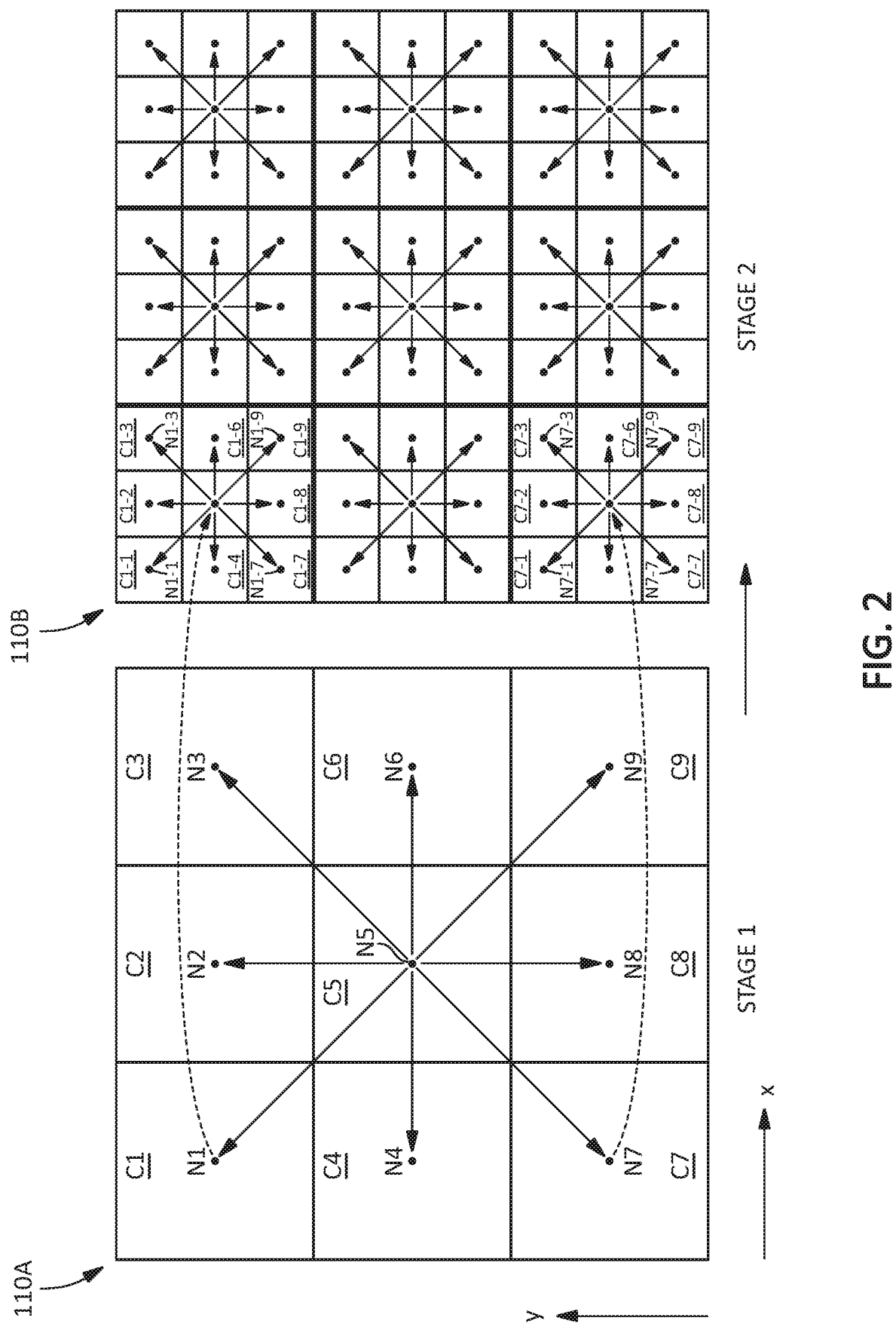
FIG. 2 illustrates an embodiment of a method for interpolating values of an attribute for an image grid according to the principles of this disclosure.

FIG. 2 illustrates an embodiment of a method for interpolating values of an attribute for an image grid according to the principles of this disclosure. The image grid may initially be divided into nine cells C1, C2, . . . C9 which may be the highest level of a hierarchy of levels as shown in grid 110A. Each cell may have a corresponding node N1, N2, . . . N9. The center cell C5 and center node N5 may be designated as a root cell and root node, respectively. The remaining cells C1-C4 and C6-C9, which may be arranged radially around the center cell, may be designated as child cells. The remaining nodes N1-N4 and N6-N9 may be designated as child nodes.

The method may begin by determining the value of the attribute for the root node (the root attribute). This may be accomplished in any suitable manner. For example, if the root node N5 happens to be a known sample point, the value of the sample at that point may be used as the root value for the highest level. Otherwise, the root value may be calculated, for example, by interpolating from other nodes outside the image grid 110A using general multipliers, adders and the like. The method may calculate metadata that may include, for example, incremental values of the attribute for offsets in the x and y-directions between the root node N5 and the child nodes. This may be accomplished, for example, using a plane equation for the attribute. The value of the attribute for each child node N1-N4 and N6-N9 may then be derived from the root node N5 by combining the root value with the metadata, as shown by the arrows in FIG. 2. For example, the value of the attribute for each child node may be calculated by adding one or more of the metadata to the root value through a streamlined addition process as described below. The process of deriving the attribute values at the child cells is referred to as Stage 1 in FIG. 2.

Each of the nine cells C1, C2, . . . C9 on the highest level may be sub-divided into smaller sub-cells on the next level down as shown in grid 110B which is another view of grid 110A after being sub-divided. For example, cell C1 may be sub-divided into second-level cells or sub-cells C1-1, C1-2, . . . C1-9. Each of the second-level cells may have a corresponding node N1-1, N1-2, . . . N1-9. (To avoid obscuring the drawing, not all of the sub-divided cells and nodes of image grid 110B have been labeled in FIG. 2, but the designation of each cell will be apparent from the regular pattern of labels.) The center cell C1-5 and center node N1-5 may be designated as a root cell and root node, respectively, for the second level. Thus, the first-level child node N1 may be used as the second-level root node N1-5. Likewise, the derived value of the attribute at the first-level child node N1 may be used as the second-level root value of the second-level root node N1-5. The remaining cells C1-1 through C1-4 and C1-6 through C1-9, which may be arranged radially around the center cell C1-5, may be designated as child cells at the second level. The remaining nodes N1-1 through N1-4 and N1-6 through N1-9 may be designated as child nodes at the second level.

The method may calculate metadata for the second-level child nodes, which may include incremental values of the attribute for offsets in the x and y-directions between the second level root node N1-5 and the second-level child nodes N1-1 through N1-4 and N1-6 through N1-9. This may be accomplished, for example, using a plane equation for the attribute. The value of the attribute for each second-level child node may then be derived from the second-level root value of the attribute at the second-level root node N1-5 by combining the second-level root value with the second-level metadata, as shown by the arrows in FIG. 2. For example, the value of the attribute for each second-level child node may be calculated by adding one or more of the second-level metadata to the second-level root value through a streamlined addition process as described below.

Similarly, each of the other first-level cells C2 through C9 may be sub-divided into smaller cells, each having its own second-level node as shown in grid 110B. In the case of the highest level center cell C5 in the center of the grid, the root node N5 may serve as the second-level root node N5-5 of the second-level cell C5-5. The process of deriving the attribute values at the second-level child cells is referred to as Stage 2 in FIG. 2.

The process of subdividing the cells, creating child nodes, and deriving values of the attribute at each child node may be repeated for any arbitrary number of levels, thereby creating a hierarchical tree structure and a grid with finer and finer resolution. Thus, the interpolation may start at the root node in the center cell of the highest level and ripple down to more and more nodes at each successively lower level. Moreover, even though the principles of this disclosure are not limited to the 3-by-3 cell arrangement of FIG. 2, this specific topology, which may be described as a diagonal hierarchical 3×3 topology, may provide numerous benefits as described below.

Figure 3:
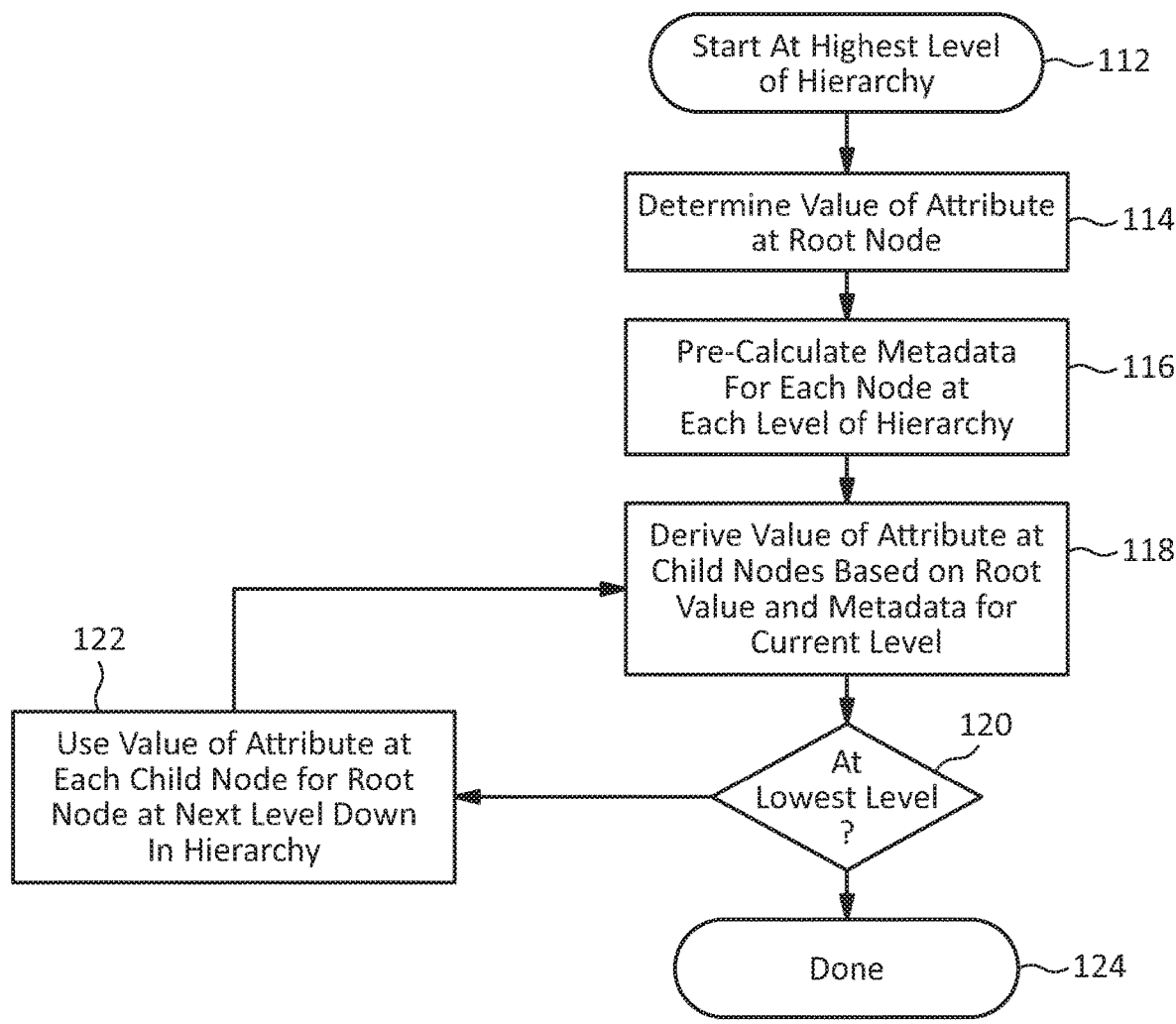
FIG. 3 is a flow chart of a method for interpolating values of an attribute for an image grid according to the principles of this disclosure.

FIG. 3 is a flow chart of a method for interpolating values of an attribute for an image grid according to the principles of this disclosure. The method may begin at starting point 112 at the highest level of a hierarchical tree. At step 114 the method may determine the value of an attribute at a root node located centrally in the image at the highest level. At step 116, metadata may be pre-calculated for multiple child nodes at one or more hierarchical levels based on a parameter of the attribute, such as a gradient. At step 118, the method may derive values of the attribute for each of the child nodes at the current hierarchical level based on the corresponding root value and metadata for the current hierarchical level. At step 120, if the current level is not the lowest hierarchical level, the value of the attribute at each child node is used as the value of a root node at the next level down in the hierarchy of step 122, and step 118 is repeated, otherwise, the process ends at 124.

The method described with respect to FIG. 3 may be modified in myriad ways and configured and adapted for use in countless applications. For example, even though some embodiments are illustrated as having a 3×3 array, i.e., geometric ratio N=9, any number of nodes N may be used. The number of nodes in the tree may then grow geometrically according to the progression 1, N, $N^2$, $N^3$, and so on, as additional levels are added. In some embodiments, however, the tree may not grow by the same ratio of nodes at each level.

As another example, in addition to interpolating continuous attribute values, the method may also be used for rasterization to determine the pixel coverage of a primitive via edge evaluation (i.e., point classification with respect to an edge or point-line distance evaluation) to determine if a particular sample is in, out, or on the edge of a primitive, and other applications. In such applications, the attributes may be, for example, a two-value in/out determination, a three value in/out/on-line determination, and the like. The cells and nodes at the various levels of the hierarchy may be used to implement any combination of pixels and/or samples. For example, in some embodiments, each of the highest level cells C1, C2, . . . C9 may be used to implement a pixel with each of the highest level nodes N1 through N9, serving as a primary sample for one of the pixels. The additional nodes may then implement additional samples for oversampling, super sampling, multi-sample anti-aliasing (MSAA), and the like. In some other embodiments, the smallest sub-divided cells at the lowest level of the hierarchy may implement the pixels of a relatively high resolution image.

The grid may have any number of cells in each direction, thus providing a generic n-cell by m-cell grid, which may lead to trade-offs, for example, between the cost of generating and storing pre-calculated metadata, tree depth, and the like. In the case of a generic, nonsymmetric n-by-m grid (i.e., for n not equal to m), the metadata that may be required to derive the values of attributes for child nodes may be given stated as n*A, m*B, n*A+m*B, n*A−m*B.

Depending on the topology of the grid, there may not be any second-level child nodes derived from one or more of the highest level nodes. This may occur, for example, if the highest level root node aligns with a line dividing two cells, or an intersection between four cells, as may happen in the case of a grid with an even number of cells on one or both sides. The root node N5 is shown in the center of the grid 110A, 110B of FIG. 2, and each other node is shown in the center of its respective cell, but it may not be necessary to place the nodes in these center locations. In some embodiments, however, it may be beneficial for a root node or other node to be located centrally in the sense of being near enough to a center as to enable efficient creation and interpolation of child nodes and other levels of a hierarchical tree.

One example application for the method illustrated with respect to FIG. 2 is to interpolate attribute values at sample locations using a plane equation. Equation 1 is an example plane equation for a parameter P of a two-dimensional surface, which may be interpolated at each location (x, y) using parameters A, B and C that define the plane:

$$i \cdot P(x,y) = A*(x - \text{Seed\_}X) + B*(y - \text{Seed\_}Y) + C \quad \text{(Eq. 1)}$$

where A is the gradient per pixel (or other cell) in the x direction, B is the gradient per pixel (or other cell) in the y direction, and C is the value of P at the location (Seed_X, Seed_Y).

FIG. 4 illustrates an example embodiment of a method for interpolating values of an attribute using a plane equation. The embodiment of FIG. 4 is described in the context of implementing a sample at each node, but the principles also apply to pixels or any other type of node. The embodiment of FIG. 4 uses a 3-sample by 3-sample grid 130 of spatially adjacent samples S1 through S9 because it may provide computational benefits as explained below. The method uses a plane equation such as Equation 1 where the parameter P is used as the attribute to be interpolated. The method pre-computes the values of the metadata A, B, A+B and A−B for the specific size of the cells in FIG. 4. The value of the attribute at the root node may be determined in any suitable manner. For example, the attribute value at the root sample may be calculated by interpolating from other samples or node outside the image grid 110A using general multipliers, adders and the like.

Once the value of the attribute at the root sample S5 is known, and the metadata values of A, B, A+B and A−B are pre-computed, the values of the attribute at the child samples S1-S4 and S6-S9 may be derived by simply adding the following values of metadata to the value of the attribute at the root sample S5 as shown in FIG. 4: sample S1: −(A−B); sample S2: B; sample S3: A+B; sample S4: −A; sample S6: A; sample S7: −(A+B); sample S8: −B; and sample S9: A−B. The simplicity of these calculations may be enabled by the symmetry of the topology. That is, each child sample is located at an x or y-offset of either zero or one common unit from the root sample. In this embodiment, the common unit is equal to the size of the grid cells. For example, sample S6 has an x-offset of one unit and a y-offset of zero, while sample S3 has an x-offset of one unit and a y-offset of one unit. This arrangement of all samples, even samples located diagonally from the root, at zero or unit offsets may enable the use of one simple addition per child sample. This, in turn, may enable the addition operation at each child sample to be implemented with a 2-input adder which may reduce the cost and area compared to the 3-input adders that may be required for the asymmetric deltas in the conventional technique of FIG. 1.

The diagonal hierarchical 3×3 topology of FIG. 4 may be adapted for use with rasterization as shown in FIG. 5. When used with rasterization, the interpolation may be based on edge equations rather than plane equations, in which case the metadata may be pre-computed as dx, dy, dx+dy, and dx−dy where dx may be the delta in the x-direction and dy may be the delta in the y-direction. The process may start with an edge equation evaluation value from alocation at an edge as the root value for the tree, and a sample may be a pixel center. The values of the child pixels may then be calculated as shown in the grid 132 of FIG. 5 by adding the following metadata to the starting value at pixel P5: pixel P1: −(dx−dy); pixel P2: dy; pixel P3: dx+dy; pixel P4: −dx; pixel P6: dx; pixel P7: −(dx+dy); pixel P8: −dy; and pixel P9: dx−dy.

Equation 1 may be adapted for use with edge equations, for example, by substituting dx for A, dy for B and "start" (an edge evaluation for an edge at a location) for C in the plane equation.

Figure 6:
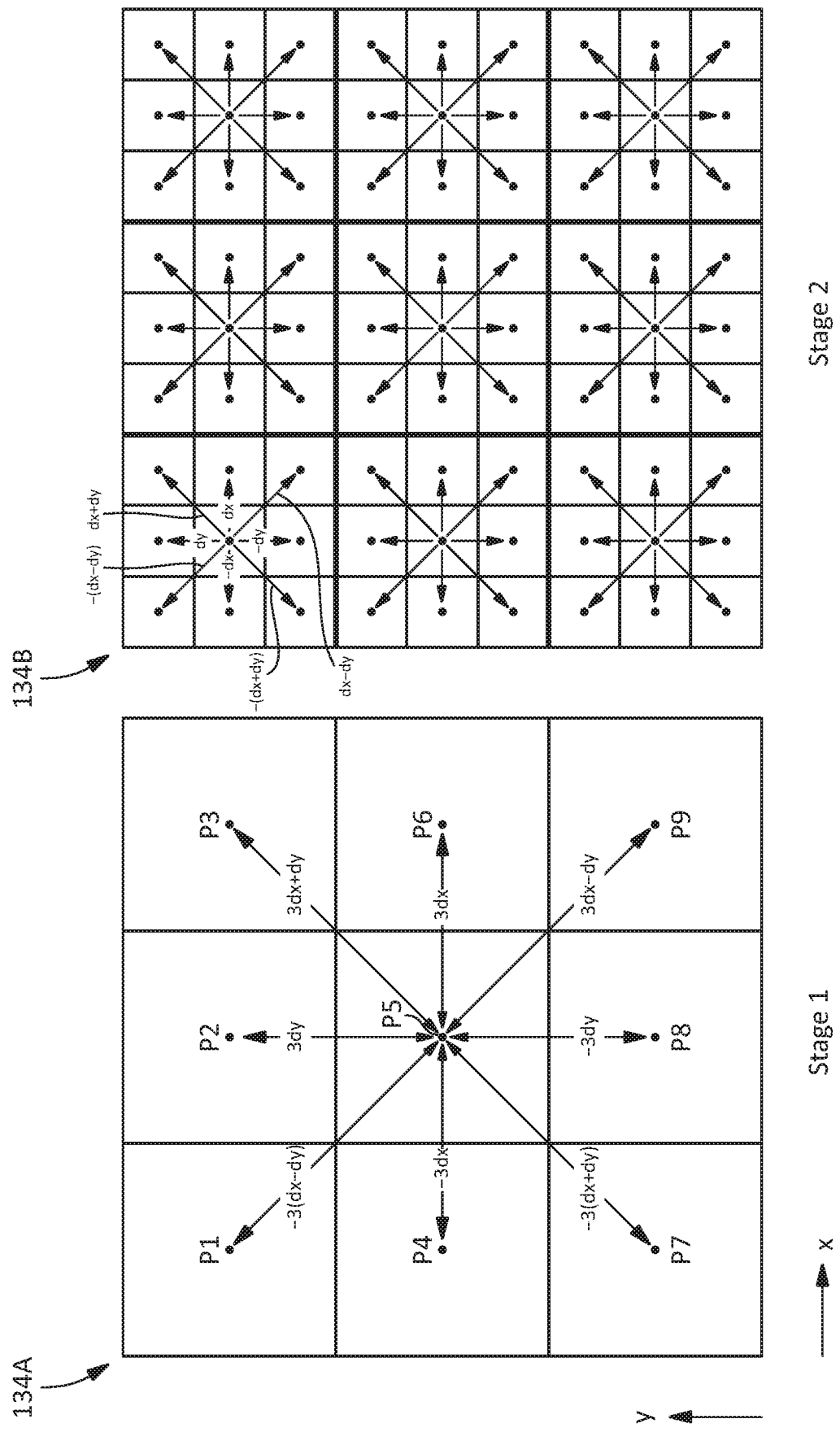
FIG. 6 illustrates an example embodiment of a method for interpolation in which metadata for adjacent levels are related through a scaling factor.

The methods of FIGS. 4 and 5 may be extended to additional levels as shown in FIG. 6, in which case the metadata for each level may be related to the metadata for an adjacent level through a simple scaling factor. For example, in the embodiment of FIG. 6, the 3×3 grid 132 of FIG. 5 may be used as the second level sub-divided cell of the first-level grid 134B, and the pre-computed metadata dx, dy, dx+dy, and dx−dy may be used to derive the second level child pixels. (The pixels P1 through P9 may be re-designated P1-1 through P1-9.) The pre-computed metadata for the first-level grid 134A may be calculated as 3dx, 3dy, 3(dx+dy), and 3(dx−dy). These first-level metadata may be used to derive the first-level child pixels P1 through P4 and P6 through P9 by adding them to the starting value of the root pixel P5 as follows: pixel P1: −3(dx−dy); pixel P2: 3dy;

pixel P3: 3(dx+dy); pixel P4: −3dx; pixel P6: 3dx; pixel P7: −3(dx+dy); pixel P8: −3dy; and pixel P9: 3(dx−dy).

This 3x factor associated with the diagonal hierarchical 3×3 topology may be especially easy to implement in digital logic because ×3 multiplication may be implemented with a 2-input adder. For example, 3*x may be implemented as x+2*x, and 2*x may be inexpensive to implement in floating point because 2*x may be achieved by incrementing the exponent of x by 1. Similarly, if the 3×3 topology of FIG. 4 is extended to another hierarchical level, the pre-computed metadata may be calculated as 3A, 3B, 3(A+B) and 3(A−B).

Figure 7:
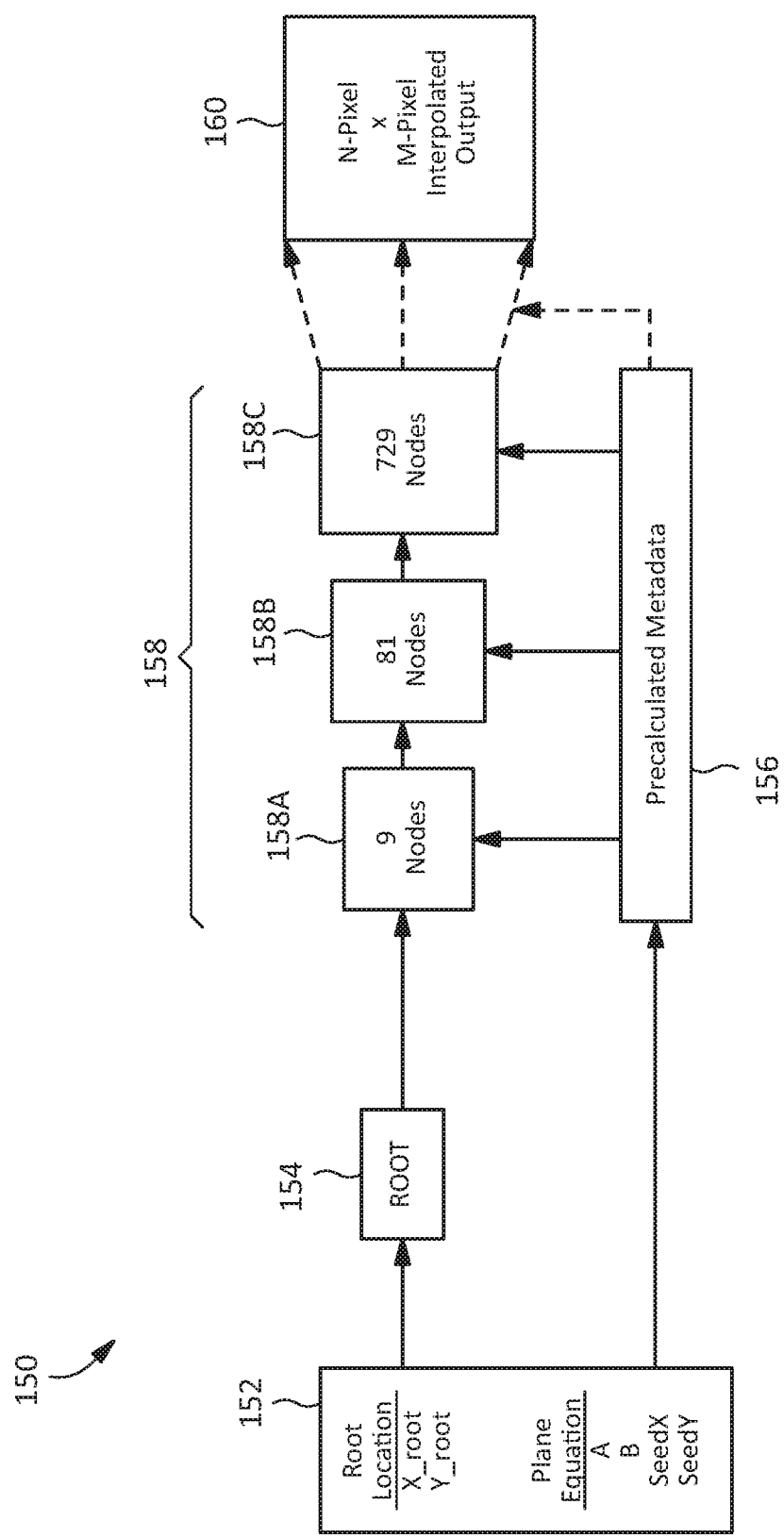
FIG. 7 is a block diagram of a micro-architecture illustrating structure and dataflow for an embodiment of a hierarchical interpolation system according to the principles of this disclosure.

FIG. 7 is a block diagram of a micro-architecture illustrating structure and dataflow for an embodiment of a hierarchical interpolation system according to the principles of this disclosure. The system of FIG. 7 may be used to implement any of the methods and processes disclosed herein, but is not limited to any of the implementation details described in this disclosure. The system 150 includes a root unit 154 configured to calculate the value of an attribute for a root node, e.g., a center sample location, at the highest level of a hierarchical tree topology. The root unit 154 may calculate the value, for example, through interpolation using general purpose multipliers, adders and the like, in response to inputs 152 that may depend on the specific application of the system. For example, when used for interpolating samples based on a plane equation, the inputs 152 may include the parameters in Equation 1 including the parameters A, B and C that define a plane, where A is the gradient per pixel (or other cell) in the x direction, B is the gradient per pixel (or other cell) in the y direction, and C is the value of P at the location (Seed_X, Seed_Y). The inputs 152 may also include the coordinates of the root location (X_root, Y_root). A metadata unit 156 may be configured to pre-calculate the metadata used to derive the value of an attribute a child nodes such as A, B, A+B and A−B in the case of plane equations and dy, dx+dy, and dx−dy in the case of edge equations in response to the inputs 152. The metadata unit 156 may be configured to use one set of metadata for each level of the hierarchical tree. For example, if the metadata precalculated for the lowest level includes a set M={A, B, A+B, A−B}, then the set pre-calculated for the next level up may be M'=3*M, the set pre-calculated for the next level above that may be M"=9*M and so on.

A tree 158 of one or more logic stages, which in this example has three stages 158A, 158B, and 158C, may be configured to perform the calculations that derive the values of an attribute at child nodes at each level of a hierarchical topology. In this embodiment, a 3×3 topology is assumed. Therefore, the first stage 158A may be built to accommodate 9 nodes, the second stage 158B to accommodate 81 nodes, and the third stage 158C to accommodate 729 nodes.

The output 160 may be in the form of an N-pixel by M-pixel interpolated output, but in other embodiments, the output may have one or more arrays of different dimensions, node-types, etc. The expected bandwidth, for example, in number of samples or pixels per clock cycle or other unit of time, may be N-pixels in the x-direction and M-pixels in the y-direction for purposes of matching throughput with a downstream processing or execution unit that may use and/or transform the output data.

The embodiment of FIG. 7 is illustrated as a 3×3 topology having three levels for purposes of illustration, but other topologies and numbers of hierarchical levels (stages) may be used. Thus, the dashed lines between stage 158C and the output 160 indicate that additional stages may be added. The system 150 of FIG. 7 may be implemented in hardware, software or any combination thereof. In a hardware implementation, the tree 158 of logic stages and metadata unit 154 may be implemented as combinational logic with simple two-input adders that may interpolate the entire tree hierarchy, that is, all nodes down to the lowest level in a single clock cycle. This may lead to reduced power and/or energy consumption and/or circuit area requirements. The root unit 154 may be implemented with combinational and synchronous logic to integrate into clocking of a larger image processing system. In some hardware implementations, the system 150 may be integrated into a graphics processing unit (GPU) on an integrated circuit (IC) where it may enable an improvement in rendering frame rate.

In the case of a software implementation, the methods and architectures disclosed herein may reduce the required constant scratch space for addition and/or subtraction operations. In some hybrid embodiments, a series of hierarchical tree stages may be implemented in hardware and fed with a root value and/or metadata provided by software.

Some other potential benefits of the system of FIG. 7, as well as the other embodiments disclosed herein are as follows. If N is the number samples or other nodes that are to be interpolated per clock cycle, i.e., the number of nodes in the lowest level of the grid tree, the logical depth of the tree may be given by the logarithm of (N+1) with respect to base 9, that is log(N+1). This may compare favorably with the conventional technique of FIG. 1 in which the logic level may increase geometrically as the value of N increases. Moreover, the diagonal hierarchy, especially in a 3×3 implementation, may reduce the logic level and/or critical path of the addition process. Thus, it may be favorable for high frequency design synthesis and reduced latency due to propagation delay through one or more stages of a hierarchical tree. Further, since relatively few values of metadata may need to be stored, e.g., A, B, A+B, and A−B or a scaled version thereof per level, this may reduce the cost per computed value.

The embodiment of FIG. 7, as well as the other embodiments disclosed herein, may be implemented in a serialized hybrid configuration in which one or more of the higher levels may be implemented using a conventional interpolation technique such as the sequentially traversed x and y paths shown in FIG. 1. A hybrid configuration may simplify the implementation at one or more higher levels while still using a hierarchical tree topology at the lower levels, i.e., close to or at the bottom leaf nodes where the cost savings of a hierarchical tree topology may be greatest. Moreover, synthesis tools in electronic design automation (EDA) platforms may be able to automatically optimize unused leaf nodes when grids having dimensions other than 3×3 are used.

Figure 14:
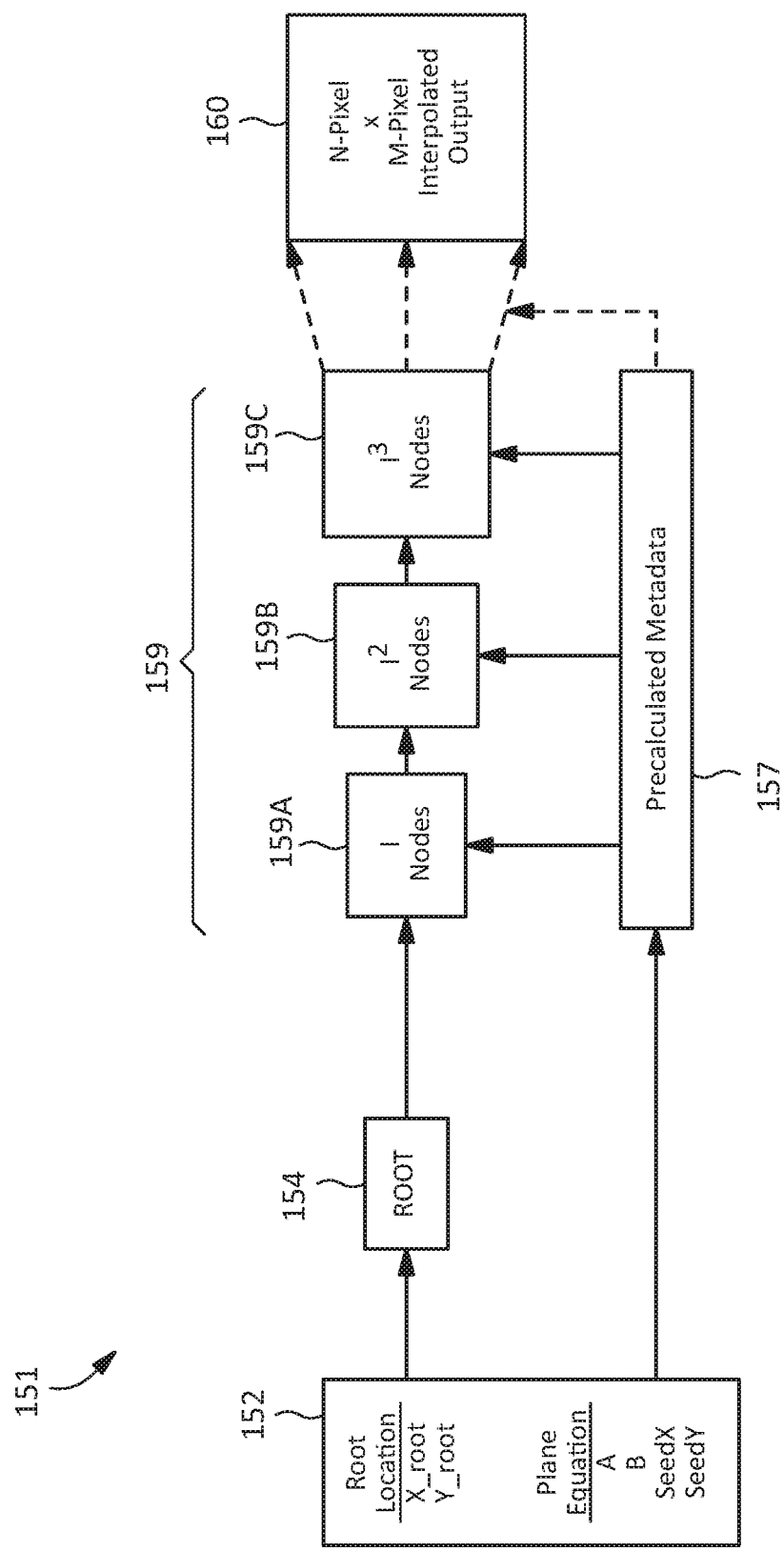
FIG. 14 is a block diagram of another micro-architecture illustrating structure and dataflow for an embodiment of a hierarchical interpolation system according to the principles of this disclosure.

FIG. 14 is a block diagram of another micro-architecture illustrating structure and dataflow for an embodiment of a hierarchical interpolation system according to the principles of this disclosure. The system 151 of FIG. 14 may be architecturally similar to the system 150 of FIG. 7, but it may include a generalized tree 159 with stages 159A, 159B, 159C, . . . having "I" nodes, $I^2$ nodes, $I^3$ nodes, . . . , respectively. "I" may be given by I=W*Z where W and Z may represent the number of nodes in the x and y directions, respectively. Thus, each node may branch out to I nodes at the next stage. The number of nodes at each stage may grow according to the following pattern or progression: 1, I, $I^2$, $I^3$, $I^4$, . . . as the tree grows from the root node to the leaf nodes.

The numbers I, W and Z may be selected, for example, as constants during the design process. The embodiment of FIG. 7 may be seen as a special case of the embodiment of FIG. 8 where W=3, Z=3, and therefore, I=9.

The embodiment of FIG. 14 may be characterized as having a generalized logic level or tree depth that is given by O(log N), where N may be the number of nodes in the lowest level of a hierarchical tree, and O may represent generalized complexity notation which may be related to asymptotic bounds. For example, in an embodiment where each node may branch out to "I" nodes at the next stage, the logic level, and thus the latency caused by propagation delay through the stages of the tree, may be given by the logarithm of N with respect to base I, that is O(log N). Depending on the implementation details, this may compare favorably with the conventional technique of FIG. 1 in which the logic level may be given by O(N) as N increases. Thus, in some embodiments, a system having a generalized tree topology as shown in FIG. 14 may reduce the logic level and/or propagation delay/latency of interpolation from O(N) to O(log N).

In some embodiments, the metadata may be viewed as having three generalized components: an X component, a Y component, and an XY component. For example, when using edge equations, the X, Y and XY components may be dx, dy and dx+/−dy, respectively. The X, Y and XY components may be designated as META_X, META_Y, and META_X+/−META_Y, respectively. Just as the number of nodes at each stage may grow moving from the root node to the leaf nodes, the metadata may grow moving in the opposite direction from the leaf nodes to the root node as: {META_X, META_Y, META_X+/−META_Y, . . . }, {W*META_X, Z*META_Y, W*META_X+/−Z*META_Y . . . }, {$W^2$*META_X, $Z^2$*META_Y, $W^2$*META_X+/−$Z^2$*META_Y . . . }, {$W^3$*META_X, $Z^3$*META_Y, $W^3$*META_X+/−$Z^3$*META_Y . . . } . . . .

The metadata unit 157 may be configured to use one set of metadata for each level of the hierarchical tree. For example, if the metadata precalculated for the lowest level includes a set M=(META_X, META_Y, META_X+META_Y, META_X-META_Y, then the sets pre-calculated for the following levels up may be M'=I*M, M"=$I^2$*M and so on.

As with the embodiment of FIG. 7, the embodiment of FIG. 14 may be implemented in hardware, software or any combination thereof. Any number of stages may be used, and any N-pixel by M-pixel interpolated output maybe generated.

The embodiment of FIGS. 7 and 14, as well as the other embodiments disclosed herein, may be configured to work with multi-sample anti-aliasing (MSAA) which uses multiple samples per pixel to improve image quality. A common arrangement of MSAA is to use four samples per pixel arranged in a rotated 2×2 grid within the pixel. This may be referred to as 4x or 4 to 1 MSAA, but 2x, 8x and other variants of MSAA may be used.

Figure 8:
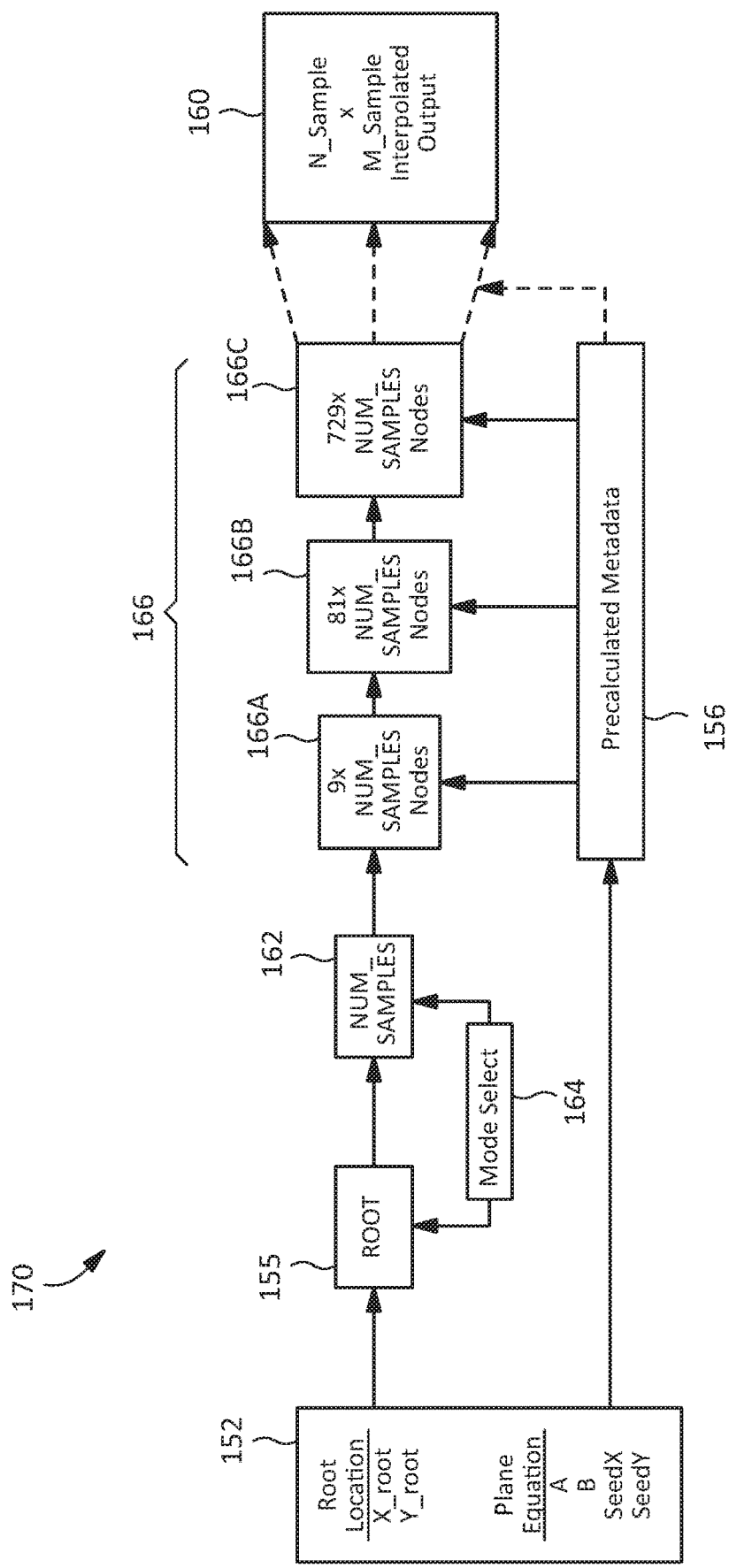
FIG. 8 is a block diagram of a micro-architecture illustrating structure and dataflow for an embodiment of a multi-sample hierarchical interpolation system according to the principles of this disclosure.

For example, to operate with MSAA, the embodiment of FIG. 7 may be modified by replicating or forking the tree structure to enable it to handle the additional samples per pixel as shown in FIG. 8. The system 170 of FIG. 8 may be generally similar to the system 150 of FIG. 7, but with the addition of a redirection unit 162 which may operate to rearrange the manner in which samples are directed from the root unit 155 to the tree 166 in response to a mode select input 164. The mode select input 164 may enable the system to switch between MSAA and non-MSAA modes. The root unit 155 may also be modified to rearrange the manner in which samples are directed to the tree 166 in response to the mode select input 164. The tree 166 of stages 166A, 166B and 166C may also be modified to handle additional nodes at each stage of the hierarchy. The number of nodes at each stage may be multiplied, for example, by the number of samples in each pixel in MSAA mode. For example, stage 166A may handle (9×NUM_SAMPLES) nodes which, in the case of NUM_SAMPLES=4, may be 36 nodes. Increasing the size of the stages by the same multiple as the number of samples per pixel in MSAA mode may facilitate switching the tree between MSAA and non-MSAA modes. Depending on the implementation details, this may provide a substantial improvement in simplicity and performance that may outweigh any potential increase in hardware cost.

In some implementations, in MSAA mode (i.e., when the mode select input 164 is active), the modified root unit 155 may start by finding/selecting one of the multiple pixels in the center pixel of the grid to use as a root sample. (For example, a sample in the left corner of the center pixel may be selected as the root sample.) The root unit 155 may then expand from the root sample and interpolate to the number of samples in the center pixel which, in this example is assumed to be four (NUM_SAMPLES=4). The root unit 155 and redirection unit 162 may then direct the four samples from the center pixel to the tree 166 which may then apply the diagonal hierarchical 3×3 topology to calculate values for other samples of other pixels adjacent to the center pixel and so on. Thus, a hierarchical tree structure may be implemented for each of the multiple samples independently.

In MSAA mode, the layout of the sample output 160 may need to be rotated to accommodate the expectations of a downstream processing unit, for example, to compensate for the arrangement of samples in each pixel. The redirection unit 162 may add one logic level to the architecture of FIG. 8, but it may be relatively cost effective.

In non-MSAA mode, (i.e., when the mode select input 164 is active), the root unit 155 and redirection unit 162 may reconfigure the input of the tree 166 for re-use by making slight modifications at the root and its connected nodes by adding a value corresponding to the original pixel grid divided by NUM_SAMPLES.

In some alternative embodiments, the tree 166 may be configured to fork the center samples of 3×3 grids coming from a previous stage to be across samples inside a pixel. In this embodiment, a hybrid tree may be used in which one or more of the stages may be implemented with conventional configuration for design simplicity.

Although the embodiment of FIG. 8 is illustrated as having a 3×3 topology, any topology may be used including the generalized form of the embodiment of FIG. 14. Each node may branch out to "I" nodes at the next level where I=W*Z and where W and Z may represent the number of nodes in the x and y directions.

In some embodiments, an N-by-M grid may be subdivided into smaller subgrids such that a different attribute may be interpolated for each sub-grid. This may be accomplished, for example, by starting at a center of each subgrid and determining a root value of the attribute to be interpolated for that subgrid at the center of the subgrid. After finding the root values for each subgrid, the values of the attributes for each entire subgrid may be interpolated using a hierarchical tree topology on each subgrid.

In some embodiments, a system may be configured with multiple trees and/or root units, wherein each tree and/or root unit may be used to interpolate values for one of the subgrids. For example, if a grid is sub-divided into k subgrids, the system may include k hierarchical trees to interpolate child nodes for each root node, along with k root units to determine the starting root values at the center of each subgrid.

Figure 9:
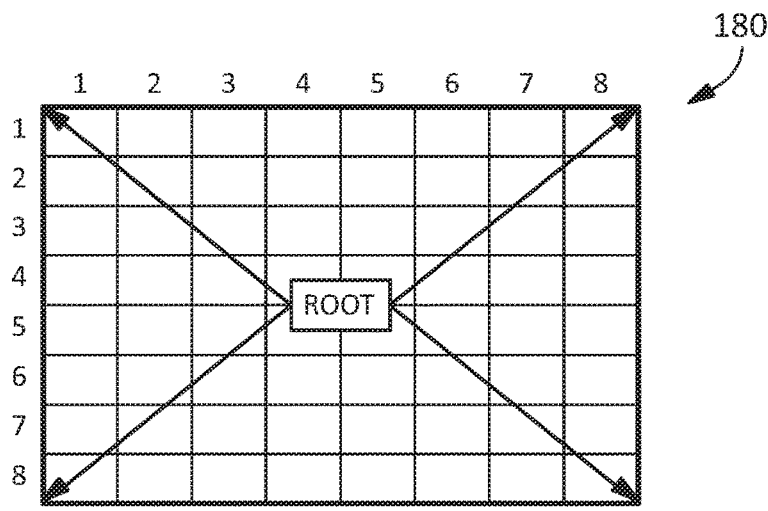
FIGS. 9 through 11 illustrate an embodiment of a grid that may be sub-divided according to the principles of this disclosure.
Figure 10:
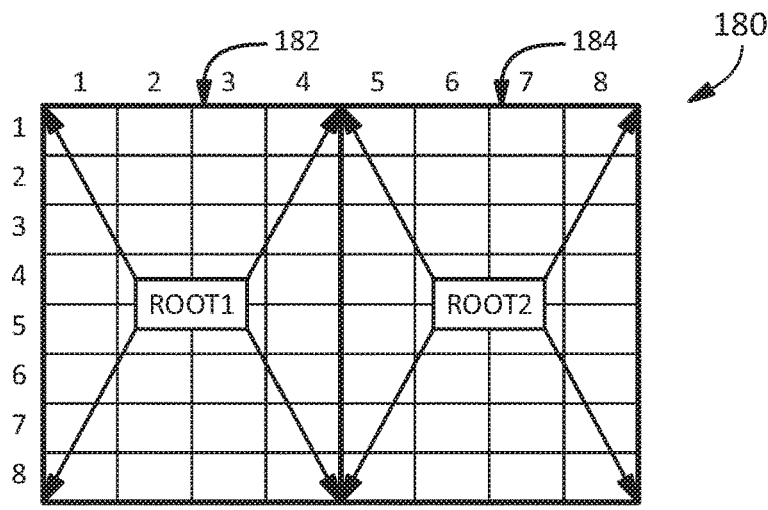
Figure 11:
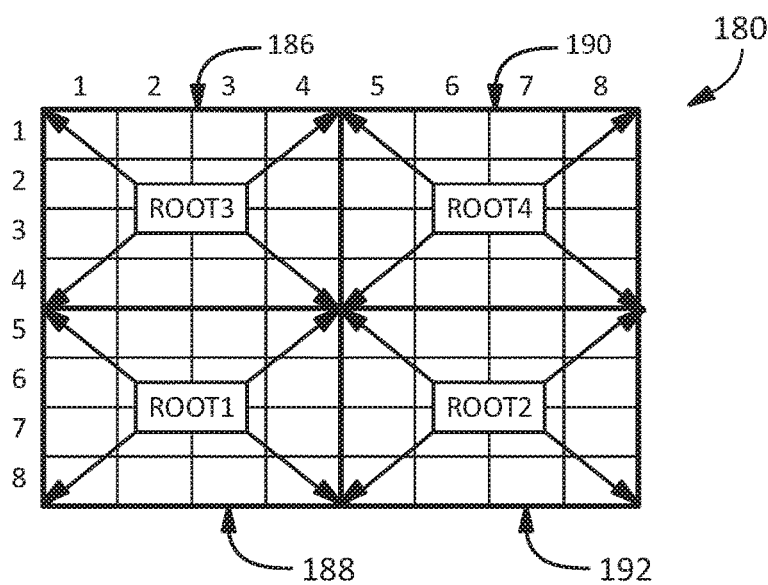

FIGS. 9 through 11 illustrate an embodiment of a grid that may be sub-divided according to the principles of this disclosure. In FIG. 9, the grid 180 is not subdivided (k=1), and the entire grid may be interpolated by a single hierarchical tree starting from a root node identified as ROOT at the center of the entire grid and progressing outward as shown by the arrows. In FIG. 10, the grid has been sub-divided into two subgrids 182 and 184 (k=2). Each subgrid may be interpolated by a different hierarchical tree using different attributes beginning at one of the root nodes ROOT1 and ROOT2 at the centers of the two subgrids. In FIG. 11, the grid 180 has been sub-divided into four subgrids 186, 188, 190 and 192 (k=4). Each subgrid may be interpolated by a different hierarchical tree using different attributes beginning at one of the root nodes ROOT1, ROOT2, ROOT3 and ROOT4 at the centers of the four subgrids. Regardless of the level of sub-division, the different subgrids may be used to interpolate attributes of the same or different primitives.

Figure 12:
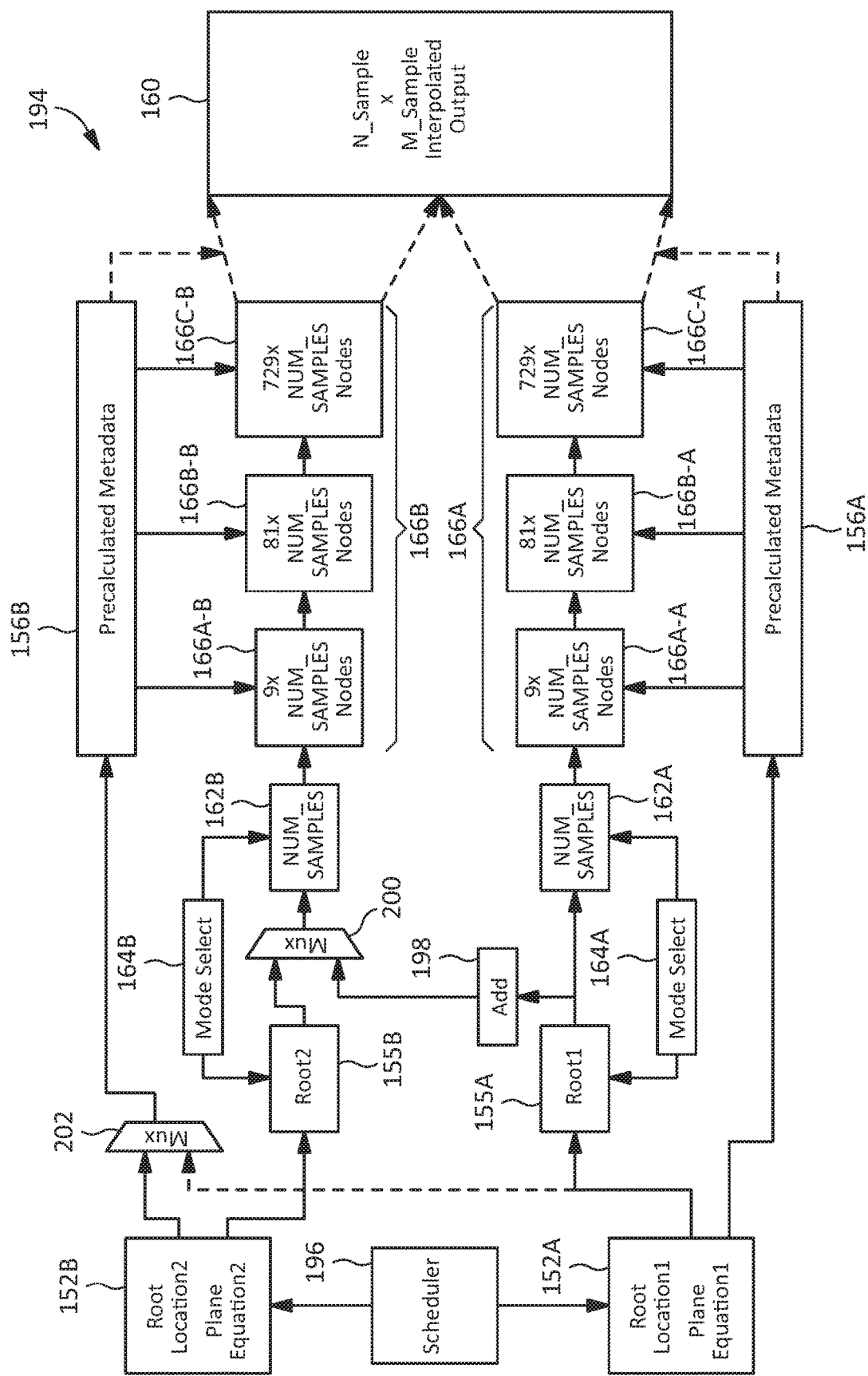
FIG. 12 is a block diagram of a micro-architecture illustrating structure and dataflow for an embodiment of a multi-attribute hierarchical interpolation system according to the principles of this disclosure.

FIG. 12 is a block diagram of a micro-architecture illustrating structure and dataflow for an embodiment of a multi-attribute hierarchical interpolation system according to the principles of this disclosure. The example system 194 of FIG. 12 illustrates an embodiment having two trees (k=2), but the principles may be extended to embodiments having any number of trees for any number of subgrids. The system 194 is illustrated as having functionality for supporting MSAA, but the functionality relating to multi-attribute interpolation is independent of the MSAA functionality, and the MSAA functionality may be omitted.

The system 194 of FIG. 12 includes a first hierarchical tree 166A, root unit 155A, and metadata unit 156A that are capable of operating essentially independently of a parallel second hierarchical tree 166B, root unit 155B, and metadata unit 156B. It may, however, be beneficial to operate the two halves from the same clock, and/or to enable them to work together in some modes. Each half of the system may receive separate root location and plane equation inputs 152A and 152B. A scheduler 196 may be configured to provide different inputs 152A and 152B to the two halves of the system 194. For example, the scheduler 196 may provide different root locations and plane equations to enable the system to perform the parallel interpolations illustrated in FIG. 10.

The system of FIG. 12 may be used to independently interpolate two different attributes for two different subgrids based on two different plane equations and two different root locations per clock cycle. Each half of the system may use its respective root location and plane equation to find the value of the attribute at the center location of its respective grid, and then implement a hierarchical tree such as tree 166A or 166B to evaluate the value of the attribute through the remainder of its subgrid. For example, the first root unit 155A may determine the value of ROOT1 in FIG. 10, while root unit 155B may determine the value of ROOT2 in FIG. 10. In this example, the trees implement a diagonal 3×3 topology, but other topologies may be used. For example, any generalized topology may be used as shown in embodiment of FIG. 14. Each node may branch out to "I" nodes at the next level where I=W*Z and where W and Z may represent the number of nodes in the x and y directions.

As with the other embodiments described above, the embodiment of FIG. 12 may be implemented in hardware, software or any suitable combination thereof. If implemented in hardware using combinational logic for the trees 166A and 166B, the system may be capable of interpolating two subgrids, such as those shown in FIG. 10, in a single clock cycle. The system may also be scaled to include any number of trees for interpolating any number of subgrids simultaneously. It may be beneficial to sub-divide the entire grid into subgrids of equal size as shown in FIGS. 9-11 as this may enable the trees to be balanced and reduce the logic level of the trees. The hardware configuration of the system may also be adapted to balance various factors such as cost, power and energy consumption, performance, etc. For example, each of the trees in the multi-attribute embodiment of FIG. 12 may be implemented with half of the amount of hardware as a single attribute embodiment, which may cause each half to run at about half the speed as a single attribute version, but still maintain the same N×M sample throughput per clock cycle at the combined output. Alternatively, each half may be implemented with the same amount of hardware as a single-attribute embodiment. This may effectively double the amount of hardware and result in double sample throughput of the combined N×M sample output.

In some embodiments, a multi-attribute hierarchical tree may be configured to share resources, for example, in cases were less than k attributes per clock need to be interpolated. This may be accomplished, for example, by including multiplexers and/or adders close to the head of the tree. In some embodiments, this may enable the system to maintain the same N×M sample throughput per clock even while sharing resources.

The embodiment of FIG. 12 includes functionality that may enable it to be reconfigured to share resources. For example, if only one attribute needs to be interpolated for the entire grid, the system may be reconfigured so that both trees may be configured to interpolate half of the grid using the same root location and plane equation input. In this mode of operation, the first tree 166A may operate in the normal manner using the first root unit 155A to determine the center sample at ROOT1 using the first root location and plane equation from input 152A. However, in this resource sharing mode of operation, a multiplexer 202 may select the first root location and plane equation from input 152A as an input to the second metadata unit 156B of the second tree. Also in this resource sharing mode of operation, another multiplexer 200 may select the output of the first root unit 155A but with an offset added by adder 198 to place the root location for the second tree at an offset from ROOT1. That is, the adder 198 and multiplexer 200 may essentially replace ROOT2 with the appropriate value to enable the second tree to interpolate its subgrid using the first attribute. Thus, the two halves of the system may operate in parallel to interpolate one attribute over the entire grid 180.

The principles illustrated with respect to FIG. 12 may be helpful to configure an interpolation system to adapt to various system needs. For example, as the demand for sample throughput of a system increases, e.g., because of an increasing number of samples per grid, there may be an increasing need to for interpolating multiple attributes (from the same or different primitives) simultaneously to ensure that enough samples are interpolated. Interpolating multiple attributes simultaneously may also be helpful in situations where primitive sizes are small and/or when interpolating corners of a primitive where there may only be partial sample coverage, and thus, it may be helpful to improve utilization. The principles illustrated with respect to FIG. 12 may be adapted to help improve system performance, efficiency, and the like in any of these situations.

Figure 13:
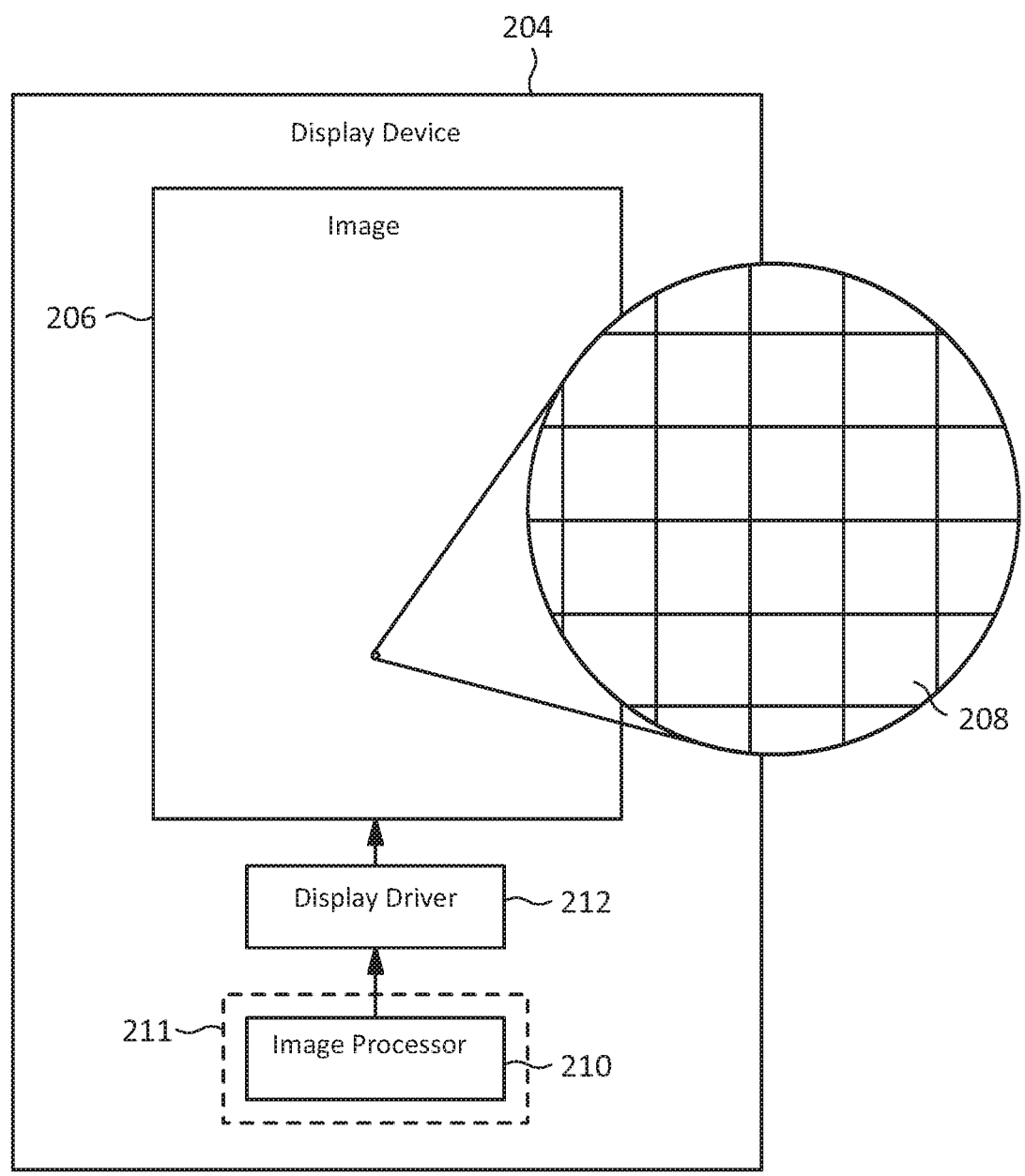
FIG. 13 illustrates an embodiment of an imaging device 204 into which any of the methods or apparatus described in this disclosure may be integrated.

FIG. 13 illustrates an embodiment of an imaging device 204 into which any of the methods or apparatus described in this disclosure may be integrated. The display device 204 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 206 with pixels. An image processor 210 such as graphics processing unit (GPU) and/or driver circuit 212 may process and/or convert the image to a form that may be displayed on or through the imaging device 204. A portion of the image 206 is shown enlarged so pixels 208 are visible. Any of the methods or apparatus described in this disclosure may be integrated into the imaging device 204, processor 210 and/or driver circuit 212 to interpolate any of the pixels 208 shown in FIG. 13. In some embodiments, the image processor 210 may include a hierarchical tree topology such as any of those described above as described as be implement on an integrated circuit 211. In some embodiments, the integrated circuit 211 may also include the driver circuit 212 and/or any other components that may implement any other functionality of the display device 204.

In addition to those mentioned above, and depending on the implementation details and circumstances, the principles of this disclosure may provide any or all of the following benefits and/or features: a method and/or apparatus that may be scalable to various pixel grid dimensions; a hierarchical topology, including a diagonal 3×3 topology, may reduce area, energy and/or power consumption and may be applicable to any sample/pixel interpolation unit/module; a hierarchical topology, including a diagonal 3×3 topology, may be applied on edge equation-based interpolation which may be useful for efficient rasterization; a hybrid tree topology, including a diagonal 3×3 topology, combined with a traditional design may provide cost savings with reduced complexity; sample interpolation with a hierarchical topology, including a diagonal 3×3 topology, may be implemented in conjunction with MSAA mode operation; a hierarchical topology, including a diagonal 3×3 topology, may be applied to any interpolation throughput for an integer array of adjacent samples in x and y directions; a hierarchical topology, including a diagonal 3×3 topology may be scaled to any other collection of samples/pixels to use with tree interpolation; the methods and apparatus disclosed herein may be used with any attribute data format; to support interpolation of multiple attributes for multiple blocks, for example, k blocks, an interpolation tree may be constructed with a forking point with k leaf nodes close to the head of the tree.

In some embodiments, the number of nodes in each stage, i.e., at each level, may follow a geometric progression. Also, in the case of a 3×3 topology, the cost of each stage may be approximately equal to nine times the cost of the previous stage. Thus, if the final stage area is A, the total area TA may be given by: TA=A+A/9+A/81+A/729 . . . =A×(9/8). Using this approximation, an example cost summary based on area is provided in Table 1 for a rasterization implementation based on the following assumptions: (1) the approximations are based on aliased mode (i.e., not multi-sample anti-aliasing); (2) fixed point arithmetic is used for area estimation based on the rasterizer dx, dy and start point; and (3) a symmetric grid having the same number of samples in the x and y-direction is used. The values shown in Table 1 are for purposes of illustration and may not represent actual values from a physical or simulated implementation.

TABLE 1

| PIXELS | Conventional Technique | Diagonal Hierarchical 3 × 3 Topology | % Improvement |
|---|---|---|---|
| 4 × 4 | 9 | 6 | 33 |
| 8 × 8 | 44 | 19 | 57 |
| 12 × 12 | 100 | 41 | 59 |
| 16 × 16 | 200 | 74 | 63 |
| 24 × 24 | 500 | 160 | 68 |
| 32 × 32 | 1000 | 260 | 74 |

Figure 15:
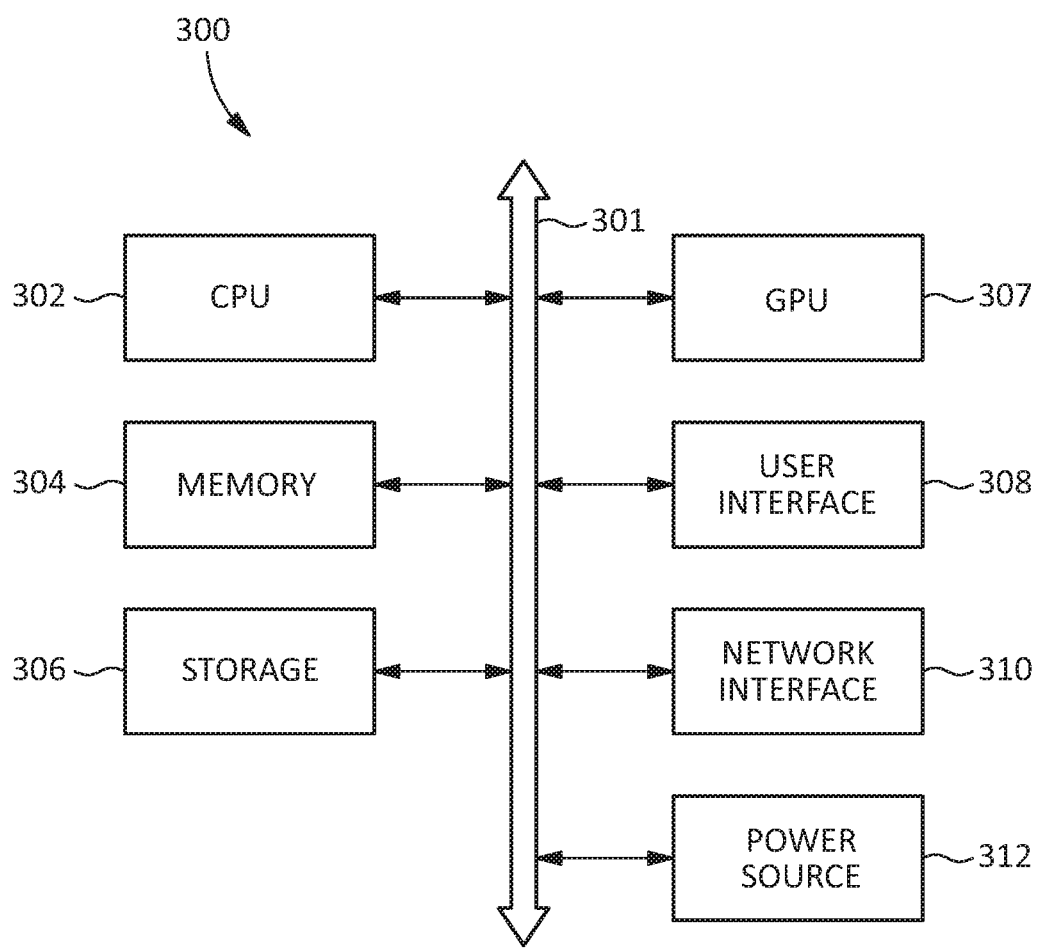
FIG. 15 illustrates an embodiment of a computing system according to this disclosure.

FIG. 15 illustrates an embodiment of a computing system according to this disclosure. The system 300 of FIG. 15 may be used to implement any or all of the methods and/or apparatus described in this disclosure. The system 300 may include a central processing unit (CPU) 302, memory 304, storage 306, a graphics processing unit (GPU) 307, a user interface 308, a network interface 310, and a power source 312. By way of example, a full hardware implementation of a hierarchical tree structure according to this disclosure may be realized in the GPU 307, whereas a full software implementation may be realized entirely within the CPU 302. In other embodiments, a full hardware implementation of a hierarchical tree structure may be realized as an integrated graphics processing unit (IGPU) in the CPU 302. In yet other embodiments, the GPU 307 may be used to implement a serialized hybrid configuration in which higher levels of a hierarchical tree structure may be implemented using conventional hardware in the GPU 307, while lower levels may be implemented in hardware and/or software using a hierarchical tree topology in the GPU 307 and/or the CPU 302. In still other embodiments, a hierarchical tree structure according to this disclosure may be distributed between any suitable combination of hardware and/or software using any of the components of the system 300. Moreover, the principles of this disclosure are not limited to implementation with any of the components illustrated in FIG. 15 but may be realized with any suitable hardware, software or combinations thereof.

In different embodiments, the system may omit any of these components or may include duplicates, or any additional numbers of, any of the components, as well as any other types of components to implement any of the methods and/or apparatus described in this disclosure.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc. as well as any virtualized or remote versions of such devices. The network interface 310 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc. The power source 312 may include a battery and/or a power supply capable of receiving power from an AC or DC power source and converting it to any form suitable for use by the components of system 300.

Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any of the all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The blocks or steps of a method or algorithm and functions described in connection with the embodiments disclosed herein may be embodied directly in hardware, in one or more software modules executed by a processor, or in a combination of the two, including in the system 300. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system, for example, a graphics processing unit (GPU) or other larger system. Any system disclosed herein, or component or portion thereof, may be implemented as its own software stack.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. Although the principles of this disclosure have been described in the context of certain applications, the principles may be applied for any attribute interpolation and/or rasterizer process, and they may be useful in any mathematical computation using edge equations, plane equations, or any other equation to interpolate or extrapolate one or more values. In some embodiments, for locations in the lowest-level of a hierarchy, a calculation may be performed and depending on the resolution of a grid or other array, alocation may correspond to various things such as a pixel, sample, centroid, etc. In some embodiments, interpolation may work at any spatial sampling frequency of a planar primitive. In some embodiments, a zero offset may refer to a substantially zero offset that enables that value to be disregarded for purposes of calculations without appreciably degrading the results.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for interpolating attribute values for an image grid, the method comprising:
    determining, by a graphics processing unit (GPU), a first-level root value of an attribute at a first-level root node located centrally in the image grid;
    calculating, by the GPU, first-level metadata based on a first gradient of the attribute in a first direction and a second gradient of the attribute in a second direction; and
    deriving, by the GPU, based on the first-level root value and the first-level metadata, first-level child values of the attribute for two or more first-level child nodes arranged radially around the first-level root node in the image grid;
    wherein at least one of the two or more first-level child nodes corresponds to at least one pixel of a display device, and the method further comprises outputting, by the GPU to the display device for display, at least a portion of the image grid.

2. The method of claim 1, further comprising:
    using one of the first-level child nodes and its corresponding first-level child value as a second-level root node and second-level root value for a cell of the image grid, wherein the root node of the cell is located centrally in the cell;
    calculating, by the GPU, second-level metadata based on the first gradient and the second gradient; and
    deriving, by the GPU, based on the second-level root value and the second-level metadata, second-level child values of the attribute for two or more second-level child nodes arranged radially around the second-level root node in the cell.

3. The method of claim 1, wherein each of the first-level child nodes is offset symmetrically from the first-level root node in the first and second directions.

4. The method of claim 3, wherein each of the first-level child nodes is offset from the first-level root node by substantially zero or substantially the same distance in the first and second directions.

5. The method of claim 1, wherein:
    the image grid comprises a 3×3 array of cells having a center cell and eight outer cells;
    the two or more first-level child nodes include eight first-level child nodes;

the first-level root node is located at a center of the center cell; and each first-level child node is located at a center of one of the outer cells.

6. The method of claim 1, wherein the first-level metadata includes incremental values of the attribute for offsets in the first and second directions.

7. The method of claim 1, wherein:

a value of a first parameter A is based on the first gradient;

a value of a second parameter B is based on the second gradient; and the first-level metadata includes the values A, B, A+B, and AB.

8. The method of claim 2, wherein:

a value of a first parameter A is based on the first gradient;

a value of a second parameter B is based on the second gradient;

the image grid comprises a 3×3 array of cells;

the first-level metadata includes the values 3A, 3B, 3(A+B), and 3(AB); and the second-level metadata includes the values A, B, A+B, and A−B.

9. The method of claim 1, wherein the first-level metadata is calculated based on a plane equation.

10. The method of claim 9, wherein:

the plane equation has the form P(x, y)=A*(x−Seed_X)+B*(y−Seed_Y)+C;

P is a parameter of a two-dimensional surface which is interpolated at each location (x, y), wherein x is a distance in an x-direction and y is a distance in a y-direction;

A is a gradient per pixel (or other cell) in the x direction;

B is a gradient per pixel (or other cell) in the y direction; and

C is a value of P at a location (Seed_X, Seed_Y).

11. The method of claim 1, wherein deriving the first-level child values comprises adding one or more of the first-level metadata to the first-level root value.

12. The method of claim 1, further comprising rasterizing an image in response to the values of the attribute.

13. A method for interpolating values of an attribute for an image grid, the method comprising:

determining, by a graphics processing unit (GPU), a root value of the attribute for a root node located centrally in the image grid;

pre-calculating, by the GPU, metadata for multiple child nodes in one or more hierarchical levels based on one or more gradients of the attribute; and deriving, by the GPU, values of the attribute for each of the child nodes at each of the hierarchical levels based on the corresponding root value and metadata for the hierarchical level of each child node;

wherein each child node is used as a root node in the next hierarchical level;

wherein at least one of the multiple child nodes corresponds to at least one pixel of a display device, and the method further comprises outputting, by the GPU to the display device for display, at least a portion of the image grid.

14. The method of claim 13, wherein each node at each level is used as a root node at the next hierarchical level.

15. The method of claim 13, wherein:

the image grid has multiple outer cells arranged radially around a central cell; and the root node is located in the central cell.

16. The method of claim 13, wherein the root node is located in a first cell having one or more additional nodes, the method further comprising:

determining, by the GPU, values of the attribute for the one or more additional nodes in the first cell; and deriving, by the GPU, values of the attribute for additional child nodes corresponding to each of the additional nodes in the first cell at each of the hierarchical levels, wherein the value of the attribute for each additional child node is derived based on the value of the attribute for the corresponding additional node in the first cell, and the metadata for the corresponding hierarchical level.

17. The method of claim 16, wherein the values of the attribute for the additional child nodes are derived through a separate hierarchical tree for each of the nodes in the first cell.

18. A system for interpolating values of an attribute for an image grid, the system comprising a graphics processing unit (GPU) comprising:

a root unit configured to determine a root value of the attribute for a root node located centrally in the image grid;

a metadata unit configured to pre-calculate metadata for multiple child nodes in one or more hierarchical levels based on one or more parameters of the attribute; and a tree of one or more logic stages coupled to the root unit and metadata unit and configured to derive values of the attribute for each of the child nodes at each of the hierarchical levels based on the corresponding root value and metadata for the hierarchical level of each child node;

wherein at least one of the multiple child nodes corresponds to at least one pixel of a display device, and the GPU is configured to output to the display device for display, at least a portion of the image grid.

19. The system of claim 18, further comprising a redirection unit coupled between the root unit and the tree and configured to rearrange the manner in which samples are directed from the root unit to the tree based on an operating mode.

20. The system of claim 19, wherein the logic stages are configured to handle multiple samples in a multi-sample operating mode.

* * * * *